(12) United States Patent
Baumann et al.

(10) Patent No.: US 7,003,373 B2
(45) Date of Patent: Feb. 21, 2006

(54) METHOD AND DEVICE FOR NUMERICAL CONTROL

(75) Inventors: Joachim Baumann, Dortmund (DE); Klaus Hertinger, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 77 days.

(21) Appl. No.: 10/672,082

(22) Filed: Sep. 26, 2003

(65) Prior Publication Data
US 2004/0138776 A1  Jul. 15, 2004

(30) Foreign Application Priority Data
Sep. 27, 2002 (DE) ............................. 102 45 290
Sep. 22, 2003 (DE) ............................. 103 43 809

(51) Int. Cl.
*G06F 7/50* (2006.01)
*G05B 19/417* (2006.01)

(52) U.S. Cl. ............ 700/189; 700/169; 700/188; 318/573; 318/696

(58) Field of Classification Search ........ 700/186–189; 318/569–574
See application file for complete search history.

(56) References Cited
U.S. PATENT DOCUMENTS

| | | | | |
|---|---|---|---|---|
| 4,262,336 A | * | 4/1981 | Pritchard | ................ 700/169 |
| 4,571,687 A | * | 2/1986 | Fukuyama et al. | ......... 700/160 |
| 4,983,899 A | * | 1/1991 | Komatsu et al. | ............ 318/571 |
| 5,019,763 A | * | 5/1991 | Komatsu | .................... 318/571 |
| 5,144,214 A | * | 9/1992 | Komatsu et al. | ........... 318/600 |

FOREIGN PATENT DOCUMENTS

| | | |
|---|---|---|
| DE | 691 00 887 T2 | 5/1994 |
| EP | 0 672 976 A1 | 9/1995 |

* cited by examiner

*Primary Examiner*—Leo Picard
*Assistant Examiner*—Douglas S. Lee
(74) *Attorney, Agent, or Firm*—Henry M. Feiereisen

(57) ABSTRACT

A method and a device for numerical control of machine tools, robots, production machines and the like, is described, whereby complex and large task can be processed more easily. This is realized by a numerical controller which can generate a marker signal, in particular desired position values for system components, in particular drives, at a certain interpolation clock cycle or rate. A control axis provides in an interpolation clock cycle reference values for reading a table, whereby desired position values for asynchronous successor axis can be obtained. The tables can also store switching functions that define start and end points independent of the interpolation clock cycle. As soon as the integration clock cycle has reached or exceeded the point in time of a reference value, execution of the functions stored in the table can be triggered. The table can be stored in encoded and/or non-encoded form.

19 Claims, 8 Drawing Sheets

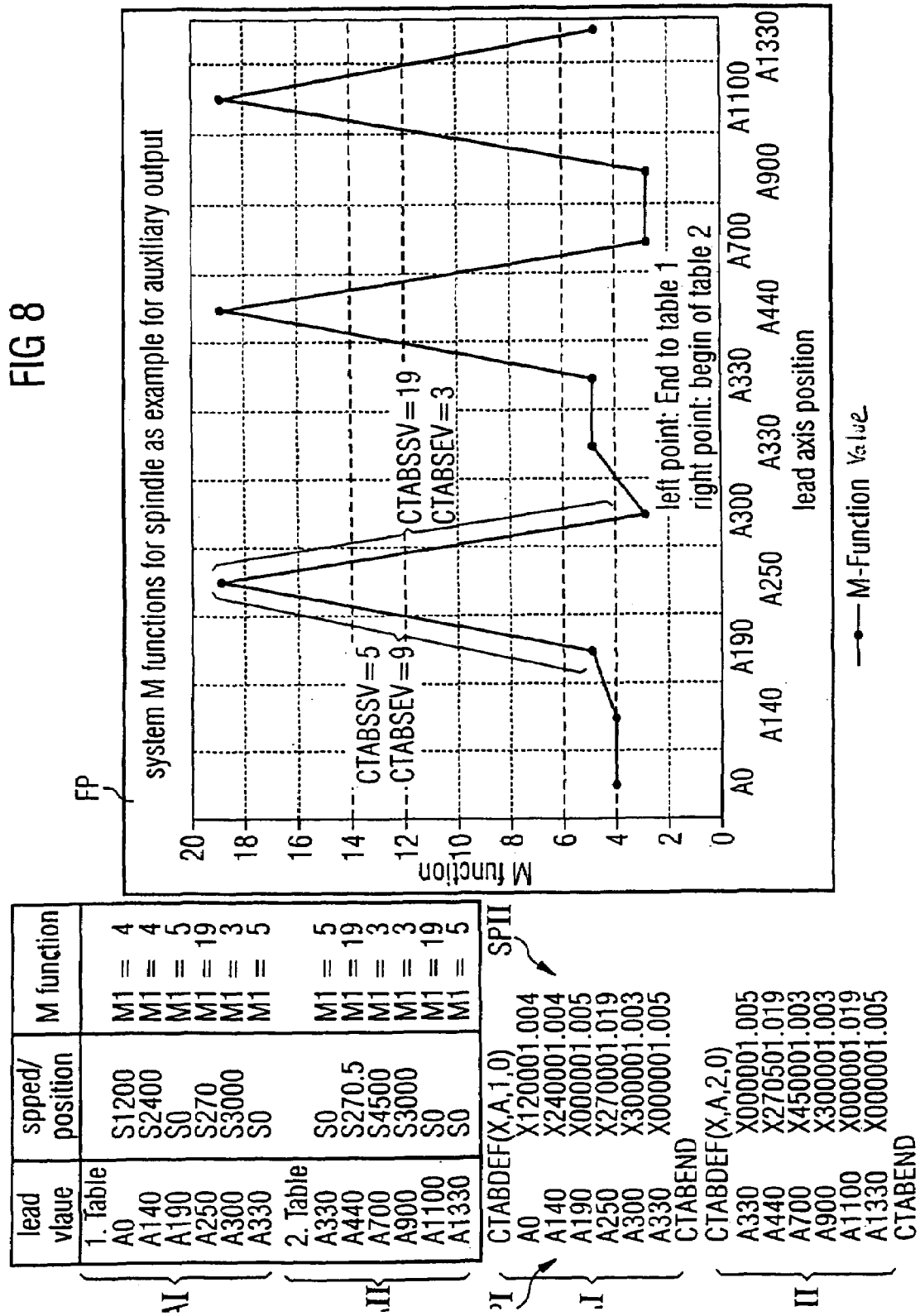

METHOD AND DEVICE FOR NUMERICAL CONTROL

CROSS-REFERENCES TO RELATED APPLICATIONS

This application claims the priorities of German Patent Applications, Serial Nos. 102 45 290.3, filed Sep. 27, 2002, and 103 43 809.2, filed Sep. 22, 2003, pursuant to 35 U.S.C. 119(a)–(d), the disclosure of which is incorporated herein by reference.

BACKGROUND OF THE INVENTION

The present invention relates to a numerical controller as well as to a method for numerical control of machine tools, robots or production machines.

Control of machines of this type can be described by tables and/or ISO programs. A configuration of a control program using tables is disclosed, for example, in European Pat. No. EP 0 672 976 A1 or German Pat. No. DE 691 00 887 T2. Movements and actions can be stored as a function of a control value or control values in the form of control axis value pairs and successor axis value pairs. A control value is a marker signal. A fundamental method for programming a numerical controller of a machine-tool, a robot or a production machine is described in the book *NC/CNC Handbook* by Hans B. Kief. This reference also describes corresponding numerical controllers.

Numerical controllers of this type are used for increasingly complex tasks. As a result, the numerical controller and/or the program for numerical control has also become more complex and costly.

It would therefore be desirable and advantageous to provide an improved numerical controller for machine tools, robots or production machines, which obviates prior art shortcomings and is able to specifically facilitate execution of complex and large tasks.

SUMMARY OF THE INVENTION

According to an aspect of the present invention, a numerical controller for machine tools, robots or production machines, includes a unit for generating marker signals, in particular desired position values, for system components, in particular drives, according to an interpolation clock cycle, a control axis providing reference values for reading a table according to the interpolation clock cycle, said reference values defining desired position values for synchronous successor axes, wherein a function is stored in the table independent of the interpolation clock cycle, and wherein execution of the function is triggered as soon as the interpolation clock cycle has reached or exceeded a point in time of a reference value or has exceeded a following interpolation clock cycle.

According to another aspect of the present invention, a method for numerical control of machine tools, robots or production machines, includes the steps of generating marker signals, in particular desired position values, for system components, in particular drives, according to an interpolation clock cycle, providing by way of a control axis reference values for reading a table according to the interpolation clock cycle, defining in the table encoded and/or non-encoded desired position values for synchronous successor axes, and/or extracting, independent from the interpolation clock cycle, encoded and/or non-encoded functions stored in the table, and triggering execution of these functions as soon as the interpolation clock cycle has reached or exceeded the point in time of a reference value or has exceeded the point in time in a following interpolation clock cycle.

According to yet another aspect of the invention, a numerical controller comprising a computer-readable storage medium tangibly embodying program instructions for control of machine tools, robots or production machines, the program instructions including instructions operable for causing a memory-programmable processor to generate desired position values for system components, in particular drives, according to an interpolation clock cycle, provide by way of a control axis reference values for reading a table according to the interpolation clock cycle, define encoded and/or non-encoded desired position values for synchronous successor axes, and/or extract independent from the interpolation clock cycle encoded and/or non-encoded functions stored in the table, and trigger execution of these functions as soon as the interpolation clock cycle has reached or exceeded the point in time of a reference value or has exceeded the point in time in a following interpolation clock cycle.

Numerical controllers can be used for machine tools, robots or production machines. These numerical controllers can generate in an interpolation clock cycle marker signals, in particular desired position values for system components, in particular drives. In a controller according to the invention, for example, a control axis supplies a control value with the interpolation clock rate for reading out a table which can be used to extract desired position values for a synchronous successor axis. The control value is a reference value serving as a marker signal. However, switching functions that trigger independently from the interpolation clock cycle a start and optionally an end can also be stored in the table, as well as other functions of a numerical controller or of a memory-programmable controller. As soon as the interpolation clock cycle has reached or exceeded the point in time of a reference value, an activation of the function which is stored in the table can be triggered. A function following an interpolation clock cycle can then already be executed during the preceding interpolation clock cycle. The time lag or time lead of the execution of a function can be set in form of trailing length or a leading length. Functions can therefore have an input shift and/or an output shift, which allows setting of a derivative action and/or an integration action. The derivative or integration action can be implemented as a function of a position, a time or an event. In addition, the control axis value as well as to successor axis value can have a multiplication factor. The successor object of a table can be a control value of another table, in a cascaded arrangement. The control axes, i.e., the control value, need not be a position on an axis, but can be for example a freely selectable value. This results, for example, in an addressing scheme via a state diagram.

The conventional position coupling via tables is herewith being expanded through a function coupling. The position coupling provides an axis profile, whereas the function coupling provides a function profile. A function can affect, in addition to axes, also spindles or process parameters or process states, depending on the control axis that represents the control value. A function can also influence the control value, for example, by slowing it down, speeding it up or shifting it. Functions can be used to superimpose successor objects, such as a portion of a desired axis position value or a wear quantity. A successor object can cause the activation or the deactivation of the association between one or more control axes or successor axes together with a process condition defined and optionally also encoded in the table.

In a program execution of a numerical controller, cross-references to a table are provided that depend on a reference value or reference values to be read with the interpolation clock rate, whereby executable functions are stored in the table which are executed when the interpolation clock cycle reaches or exceeds the point in time. The reference value is, for example, a position value or a time value.

The program code is reduced by storing functions in tables, because the functions stored in the table can be accessed multiple times during a program execution. With encoding, a table structure that is already stored in a program can be used so that the encoded functions fit an existing table structure. For executing the function, the encoded function has to be read and decoded. After online decoding, for example, the successor axis value is supplied to the control functions. Encoding of, for example, a successor axis value is selected for all profiles (control/successor relationships) where the successor object does not represent a desired position value, i.e., the successor axis is not moved by a conventional command "LEADON" synchronously with the control axes, as stored in the table. Instead, successor values are read via commands such as "CTABSSV/CTABSEV", and spindle parameters and/or process parameters and/or states are addressed and/or changed depending on this value. The successor axis value can hence also be encoded in function profiles, for example, for triggering several independent function executions or changes simultaneously, or for affecting these function executions or changes with an additional parameter. This can also be accompanied by a reduction of the table volume.

Storing functions in tables advantageously provides a higher deterministic compared to ISO/DIN classical program codes, i.e., all processes can be designed—depending on the control value—relative to position or time. This advantageously improves, for example, the number of collisions or prevents collisions altogether. In addition, the processes can be exactly predicted. Program execution is known to be reproducible when interpreted with preparative operational sequences, however, their deterministic is not exactly predictable. I.e., it cannot be exactly determined in which IPO cycle the axis X1 is in channel 1 and where the axis Z2 is in channel 2 at that point in time, if both channels execute independent programs. This problem is also solved by the invention.

In a process for numerical control of machine tools, robots and production machines, where marker signals, in particular desired position values for system components, in particular drives, are generated with an interpolation clock cycle, a control axis generates reference values for reading out a table with the interpolation clock cycle. In the table, encoded and/or non-encoded desired position values for synchronous successor axes are defined and/or encoded and/or non-encoded functions stored in the table can also be extracted independent of the interpolation clock cycle. These functions are triggered as soon as the interpolation clock cycle has reached or exceeded the point in time or exceeds the point in time in a next interpolation clock cycle.

A function is, for example, a function that triggers a start and/or optionally an end.

The method for operating numerical controllers relies on the underlying configuration of the numerical controller device, and vice versa.

The function stored in the table includes, for example, a hardware-implemented function. Example for such function is positioning of an axis.

If the table includes control and successor axis pairs, then this describes a successor axis motion which follows the "motion law" stored in the table depending on the control axis and/or the control value. This is typically a continuous motion.

If the table includes for a certain control value a positioning task, for example, in encoded form, such as an FA-value=18019, which in decoded form represents M19 S180, then the function is a positioning task, such as "position the spindle at 180°". The actual positioning action of the spindle is not coupled to the control value, only the start of this action. Such process can also be referred to as switching function and represents a hardware-implemented function.

The function which is stored in a table can also include, for example, a software-implemented function. A software-implemented function represents a sort of additional processing. For example, in a software-implemented function, a successor axis value is read and further processed with commands such as "CTABSSV", "CTABSEV". One example is here a spindle profile or an auxiliary function profile or a tool profile, such as an online wear correction.

When using a table in which a function is stored, axes can be moved synchronously as a function of a control axis with the help of tables, and even more complex functions can be executed. The function stored in the table also relates to, for example, a successor object, whereby the successor object is, for example, a spindle, a switching function, a parameterized function call, a PLC output/element/process, a control axis or a control value of another table association or other coupling functions. The parameterizable function call is, for example, an ISO subprogram, a so-called ISO event. A coupling function can be used to cascade one or more axes, one or more spindles, . . . , of one or more NCU/machines or a combination thereof. NCU/machines can be connected via an NCU link or PLC-CPs for data transmission. The functions available in the controller are also available as functions in the table.

A control object can be an axis, a control value, a state affected by the PLC (programmable logic control) and the like.

The tables of the afore-described type can advantageously be processed segment-wise by a mass memory through a FIFO memory in the controller that receives data from the mass memory. In other words, the tables are transferred segment-wise from a mass memory to a FIFO memory in the controller where they are processed.

However, although such segmentation can be advantageously employed with the tables of the invention, it also operates with conventional tables. Segmentation with conventional tables can also allow continuous processing of the workpiece without being restricted by the current memory location limitations of a conventional controller.

This approach permits processing of large operational sequences stored in tables without overtaxing the capacity of the control system, i.e., the controller. The table segments for one or more processing or fabrication steps can be continuously dynamically loaded while processing the ISO programs or previously stored table segments, so that these are available to the controller without delay when they are needed or when they have to be processed.

The operational sequences stored in the tables, i.e., control and/or successor axis pairs and/or functions stored in a table, can be subdivided into segments. These segments can be continuously dynamically loaded from a mass memory into a processing region of a controller. The mass memory can be, for example, a part of the controller or can be connected for data transmission to the controller via a data communication device, such as a data network. Table segments can thus be dynamically loaded segment-wise into the processing device of the controller which typically has a limited data memory space. This is referred to as "off-line loading" when table source data, i.e., table data, are stored in a mass memory which can be accessed by the controller for data communication. The term "online loading" is used when table source data are read by the controller and stored as tables that can be processed online in the SRAM or DRAM of the NCU.

With a continuously advancing control value, e.g. relating to a motion, all successor relationships, for example functions, can be switched over without interruption from one IPO clock cycle to the next from one online table to another online table. The tables that are available in the controller online can be added to each other during processing, so that an immediately following table that is available online can be appended to a previous table that is available online. This is a type of "Hot-Switch" process. A processed online table that is no longer needed for repeating processes can be erased. This frees up memory needed in the controller to process the table. The possible erasure of a segment that is no longer needed is recognized, so that the "online loading" process can be started. The "online loading" hence waits for the erasure process and dynamically loads into the freed-up memory locations a table or tables required later.

According to an advantageous embodiment of the numerical controller, tables are integrated into the execution of ISO programs so that at the end of a corresponding ISO program, the tables are immediately processed and the next ISO program starts immediately before the end of the active table processing.

In this way, the functionality of processing functions that are stored in the table can be inserted into a conventional standard ISO program to provide numerical control. This results in a mix of ISO programs and a table or tables.

Operational sequences in industrial controllers can be stored and executed both as ISO programs as well as in form of a table. Procedures stored in tables, i.e., control and/or successor axis pairs stored in a table and/or functions stored in a table can, for example, also be subdivided into segments.

If operational sequences are stored not only as conventional ISO programs, but also in ISO and in tables, then these two descriptions of operational sequences can be advantageously combined, resulting in a hybrid operational sequence.

If the basic structure of the hybrid operational sequence is based on a table, with the table including control and/or successor axis pairs and/or functions stored in the table, then this structure is referred to as "curve table based controlled." The order and dependencies that determine the selection and timing of the operational sequences to be executed—"machining order"—are stored in one or more tables. A table is encoded, for example, by using specific command profiles.

If the basic structure of the hybrid operational sequence is based on an ISO program, then the structure is referred to as "ISO-based controlled". In this case, machine commands—"machining order"—are defined using conventional ISO functions, such as program coordinations: "WAITM/SETM/ . . . "

A hybrid operational sequence also exists when a single ISO operational sequence, such as a program segment and/or a sub-program, is called or can be called from a table.

The use of hybrid operational sequences facilitates programming and/or or management of controllers.

The possibility to incorporate functions in a table, as well as segmentation of a table and mixing ISO programs with a table, results in a kind of hybrid machine control.

The procedures required for the hybrid machine control can be defined and/or generated in a format that the controller is able to read. This is typically done by having a programmer generate an ISO program or describe the required processes with the help of programming tools, such as graphic tools. For example, an engineering tool can generate a format that the controller can read. Such generation is performed by a generator. Hybrid machine control allows to also store functions in tables. The generator advantageously performs a plausibility check which, for example, looks ahead in processes, whereby process objects, such as axes, spindles, process states, etc., addressed by the program sequences are recorded on a time axis. This time axis corresponds to the control axis after the transfer to tables. If the control axis is moved, then all objects will advance in the look-ahead mode. With this look-ahead approach, states must not change the time relationship of the process objects at the processing point in time, since otherwise the programmed and, from an engineering-standpoint meaningful, process cannot be maintained. This applies, for example, also to: operational sequences that for processing are not projected onto tables, but are projected in a conventional manner onto an ISO sequence; or also to auxiliary functions which are supposed to prevent successor operations that depend on a process state. For example, a chuck of a machine tool has to be locked before a spindle with the workpiece can be sped up. In conventional system solutions using tables, the "worst-case scenario" closing time of the chuck has to be assumed to prevent an erroneous operation or a collision. Only so-called controlled functions, but not functions with acknowledgement, can be used.

This disadvantage associated with the "worst-case" scenario can be circumvented by using hybrid process sequences, i.e., a mix between tables and ISO programs. One or several ISO sequences and/or or ISO events can be changed in the process flow of a machine controlled by a controller. Process states can also be queried without having to plan for backup times. This advantageously allows optimization of the number of workpieces, rapid adaptation and changes, etc.

These advantages result from the possibility of generating so-called predecessor/successor relationships. In other words, certain dependencies can be generated for different processes. Dependencies are assigned to or communicated to mutually independent processes. The independent processes can be executed time-optimized sequentially or in parallel. The processes are synchronized at those points where the processes depend from each other, for example when waiting for a "release" of a tool carriage.

With the hybrid arrangement of the numerical control according to the invention, at least one table can be integrated in the execution of at least one ISO program so that the table is immediately processed before the end of a corresponding ISO program, and the next ISO program is immediately started before the end of the active table processing. Likewise, at least one ISO program can be integrated in the execution of at least one table so that the ISO program can be immediately started before the end of a corresponding table process, and the next table process can be immediately started before the end of the active ISO program.

The complete program execution for a numerical controller can be tested in ISO. Changes that facilitate starting up a machine can be easily incorporated. Subsequently, a table/ISO generator can be started. The table/ISO generator is advantageously an integral part of a numerical controller or machine. The hybrid design improves the deterministic nature of the operational sequences in the production of parts, shortening the production times.

Table sequences can be shifted to allow for the required dependencies. A command specifying an initial displacement can set a look-ahead control value at a start time to a value applicable at the execution time. For synchronization, table sequences can be synchronized relative to each other and/or tables can be synchronized with ISO sequences and/or—depending on the process—also in different channels and/or also in different NCs and PLCs.

Conventional approaches address successor axes, for example, with the command "LEADON." The command "LEADON" can apply motion rules stored in the tables to axes under control of a control axis. Until now, this command was unable to address spindle/process states/arbitrary NC/PLC functions, since each time a synchronization action would have to be defined. This aspect of programming has been improved by the invention. For example, an actual value of the control axis can be read in a table via a synchronization action. Desired control position functions for spindles, process, etc. are stored in this table, for example, in encoded form as successor values. An exemplary spindle profile may have, for example, the following functions:

M3Sn: speed in a clockwise direction;
M4Sn: speed in a counterclockwise direction;
M19Sp: spindle position at a certain angular position in degrees.

The following example describes the possibility of storing a function in a table independent of the interpolation clock cycle and of initiating the function, as soon as the interpolation clock cycle reaches or exceeds the point in time or has moved on to a next interpolation clock cycle. For example, an advance of 67 increments occurs during a clock period of a preset IPO clock rate. If a position at which a function is to be executed is indicated, for example, at 100 increments, which is located between the 67th increment and the 154th increment, then a reference is made to a table when this position is reached, if this position coincides with the IPO clock cycle, or after the position has been reached, meaning at the incremental position 254. The marker signal represents the 100 increments. The switch function is then stored in the table. New resulting switch functions are, for example, auxiliary function profiles, spindle tables or spindle profiles.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 8 is an illustration depicting encoding of functions and a function profile.

DETAILED DESCRIPTION OF PREFERRED EMBODIMENTS

Figure 1:
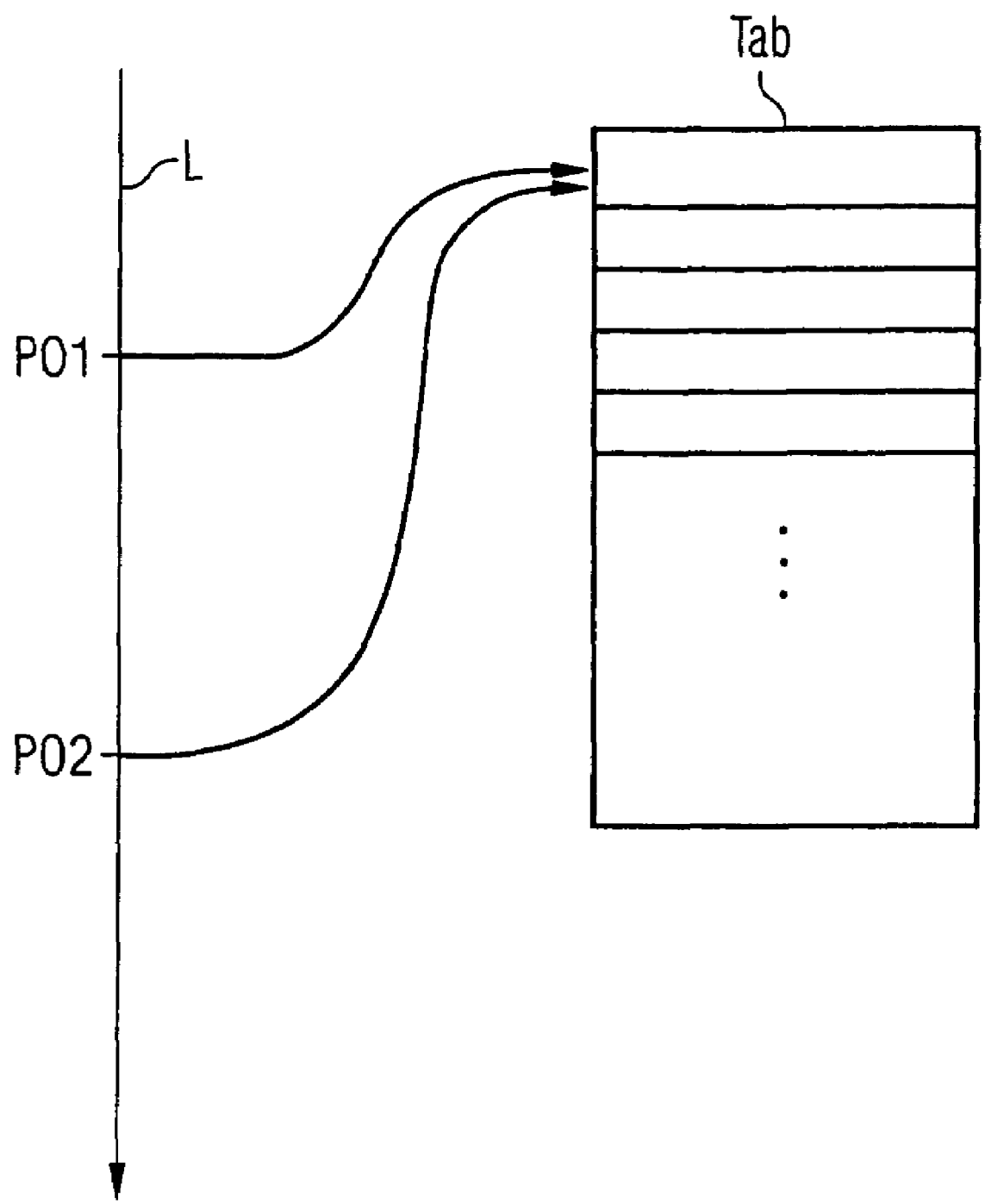
FIG. 1 shows a schematic illustration of a control axis and a table for calling switch functions.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a control axis L, with various positions PO indicated on the control axis L in the direction of the arrow. The position value is an example for in marker signal and is for example a desired position value or a desired time value. Once the marker signal reaches a certain position PO on the control axis L, a table Tab is read via a reference value associated with the position. Since the table Tab can be called several times, a second call is made, for example, at the position PO2.

Figure 2:
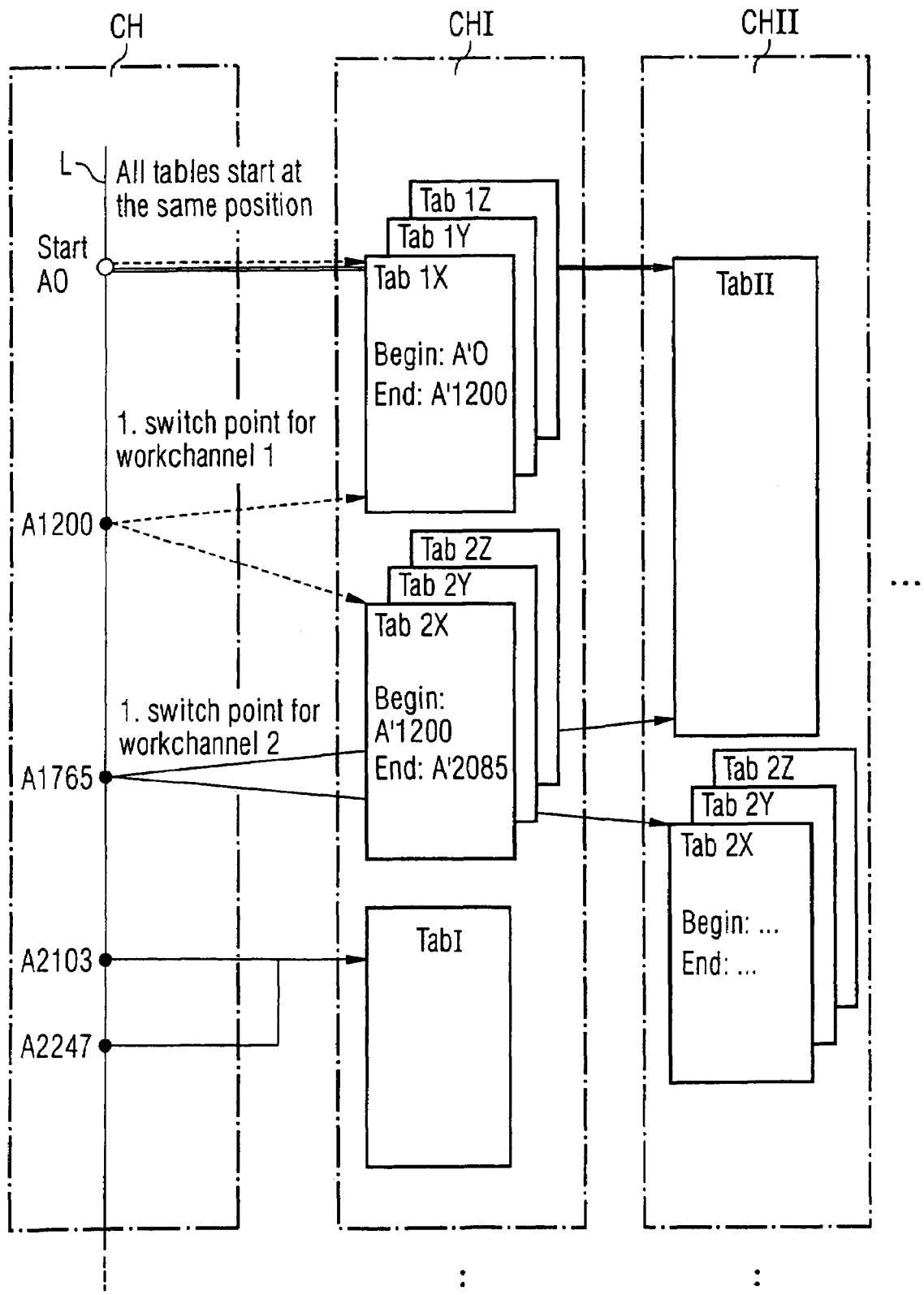
FIG. 2 shows a structured program with different channels.

The diagram depicted in FIG. 2 shows an exemplary program for a machine tool, with different available channels CH, CHI, CHII. The left channel CH operates as a sort of control channel and represents the channel of the control axis L. Additional channels CHI and CHII exist which represents the operating channels. At a starting point A0 on the control axis L, tables are addressed in the channels CHI and CHII. For channel CHI, these are curve tables Tab1x, Tab1y and Tab1z for the different axes x, y and z. Another relative starting value A0 and a relative end value A'1200 are set in the table. When the position A1200 on the control axis L is reached, the channel CHI is switched from the curve tables Tab1x, Tab1y and Tab1z for the axes x, y and z to the curve tables Tab2x, Tab2y and Tab2z for the axes x, y and z, and the relative position value is A'1200 for the starting value and A'2085 for the end value.

According to the invention, when a certain marker signal has been reached, such as A2103 or A0 as a marker signal for the starting point, a table that triggers the execution of functions can also be read out. This is shown as an example in channel CHII in form of the table TabII. At the time A0 on the control axis, the table TabII is read for the specified position A0 on the control axis. At a position A1765 of the control axis, a changeover occurs in channel CHII from of the table TabII to the curve tables Tab2x, Tab2y and Tab2z that indicate positions for the x, y and z axis. The function corresponding to the position A2103 on the control axis L Is read from an additional table TabI in channel CHI.

The table TabI can be read multiple times, i.e., for example also for the marker signal A2247. Multiple readouts are possible regardless if positions on the control axis L are different and for identical. This applies also to the Table II. The Tables I and II can also be combined (not shown). Care has to be taken that, if required, an association with the channels CHI and CHII is provided.

Figure 3:
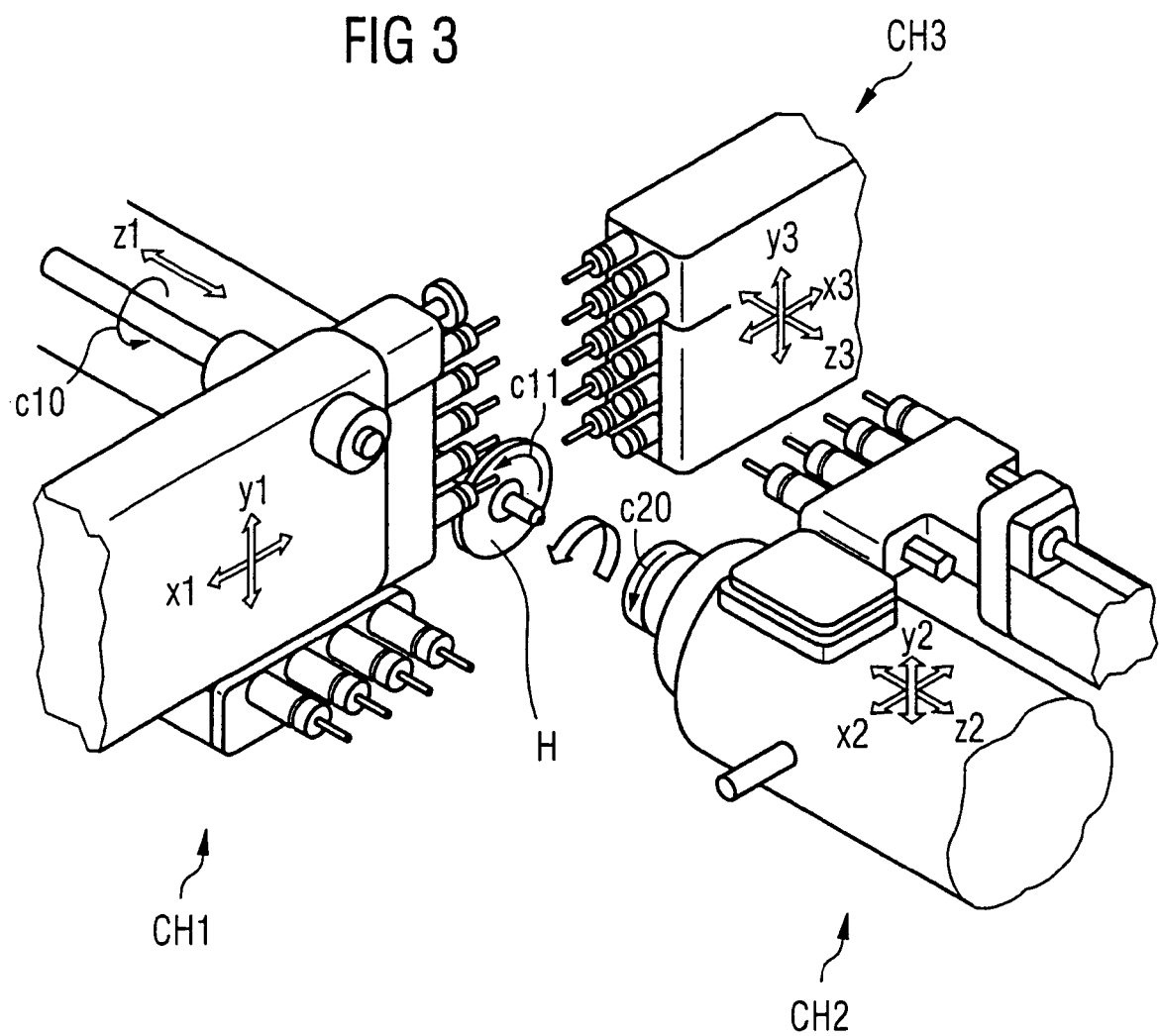
FIG. 3 is a perspective illustration of a machine tool with different axes.

The diagram of FIG. 3 shows portions of different axes x1, y1, z1, x2, y2, z2, x3, y3, z3, c10, c11, c20 of a machine tool. Execution of the numerical control is distributed over different channels CH1, CH2, CH3.

Figure 4:
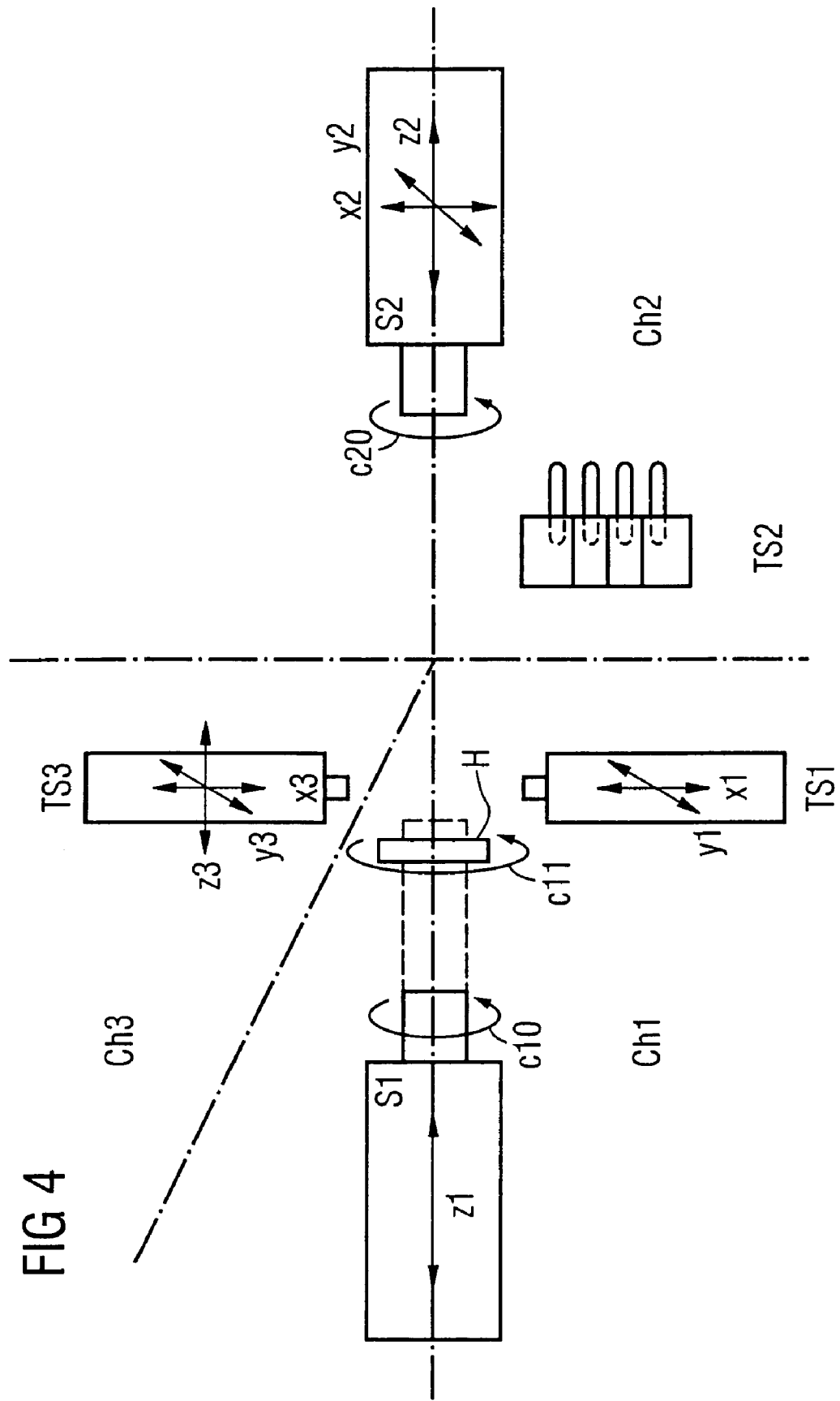
FIG. 4 shows a schematic illustration of a machine tool with three channels.

The diagram of FIG. 4 schematically depicts the channels of FIG. 3. The channel CH1 has a main spindle S1 with the motion axis z1, which rotates about an axis C10. Also shown is a guide sleeve H capable of performing a rotation designated with c11. The tool TS1 is moveable along the axes x1 and y1 which are combined in channel CH1. The channel CH2 has a second spindle S2 which is moveable along both the z2 axis and the x2 axis. The spindle S2 can also rotate about the axis c20. A tool TS2 is associated with the spindle S2.

The channel CH3 is assigned to the tool TS3 which can move along the axes x3, y3 and z3.

When using different channels CH1, CH2 and CH3, a time axis can also be executed as an interpolation parameter and/or as a control axis.

Figure 5:
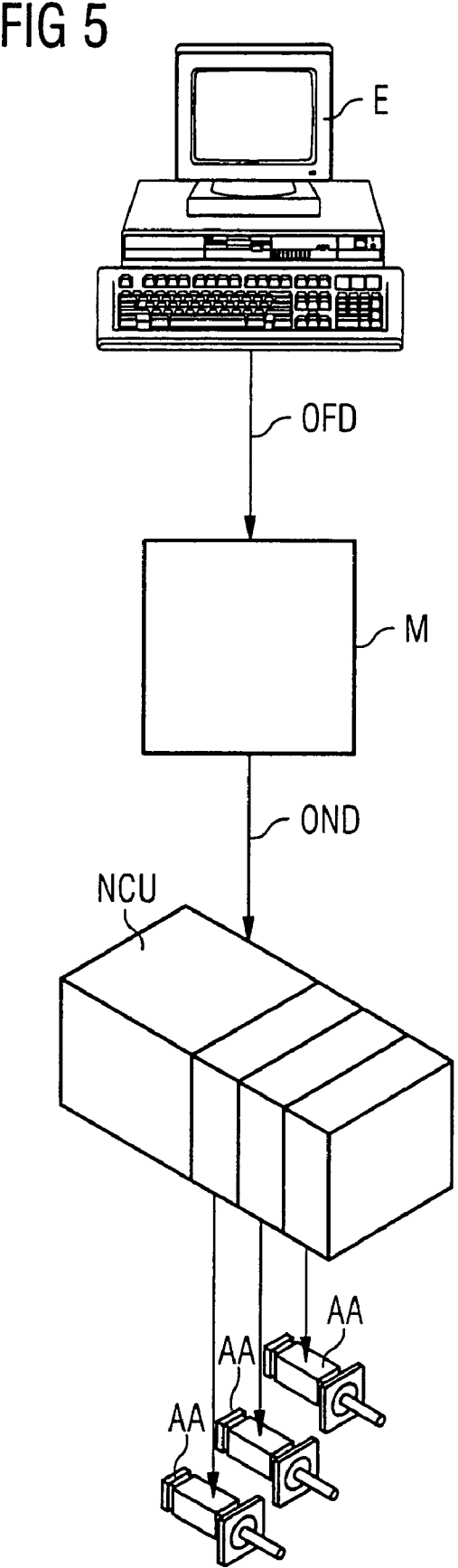
FIG. 5 shows a schematic, partly perspective illustration of a numerical controller employing a mass memory.

The diagram of FIG. 5 shows an engineering system E. Tables generated in the engineering system can be stored via an off-line download OFD in a mass memory M, for example a hard disk. The data stored in mass memory M are supplied via an online download OND to a memory-programmable controller NCU, also referred to as controller. The memory-programmable controller NCU is provided, for example, for controlling drive axes AA.

Figure 6:
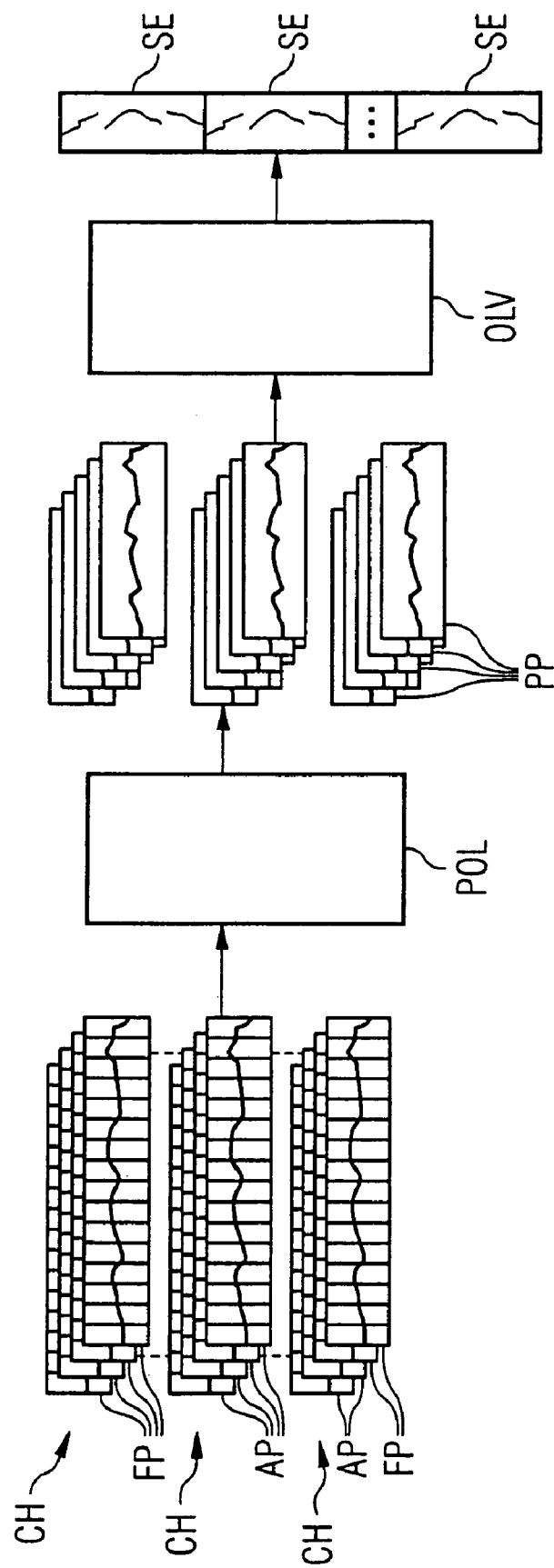
FIG. 6 is an illustration depicting processing of function profiles and/or axis profiles for storing in a mass memory.

The diagram of FIG. 6 shows function profiles FP and axis profiles AP. A function profile FP represents a table, or a portion of the table, with functions. An axis profile AP, on the other hand, represents at least a portion of the table with control/successor axis pairs. The profiles FP, AP are converted by a polynomial generated POL into polynomial profiles PP, which contain less data. An online load processor OLV is connected after the polynomial profiles PP. The online load processor OLV subdivides the polynomial profiles PP into segments SE.

Figure 7:
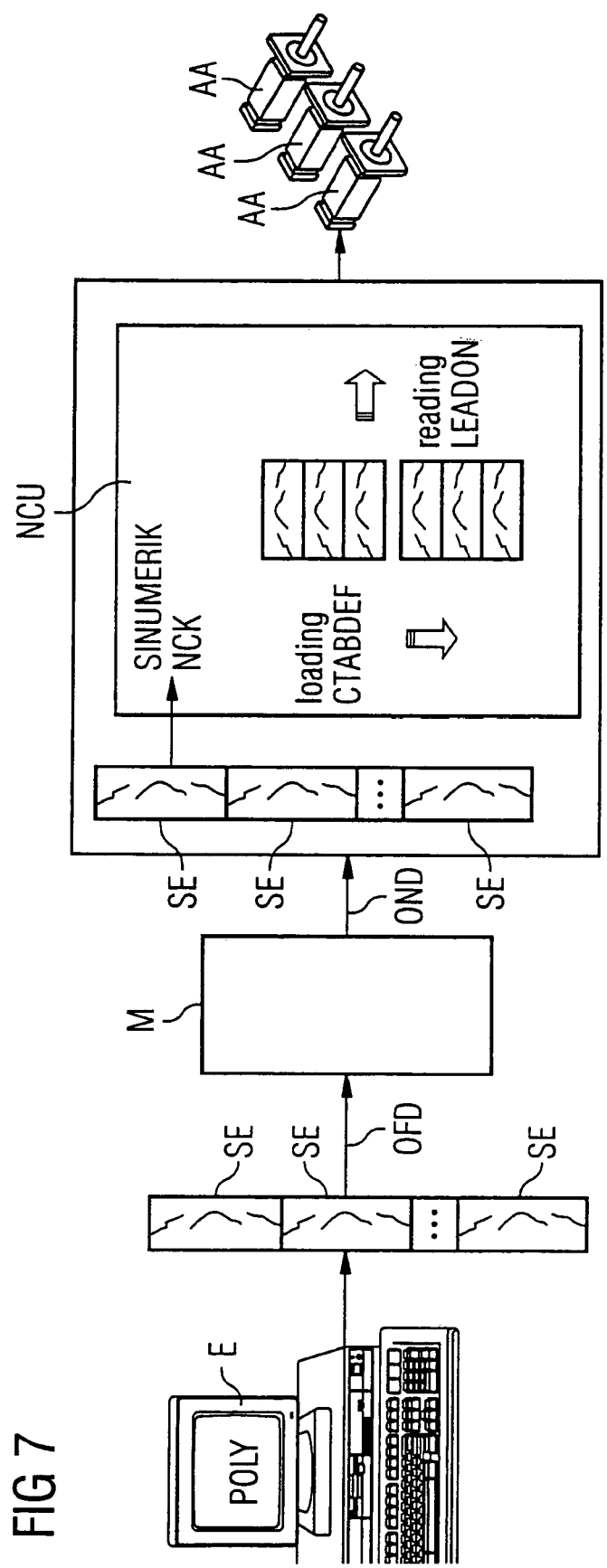
FIG. 7 is an illustration depicting an online download of segments.

The diagram of FIG. 7 shows that the segments SE are generated in the engineering system E and stored in the mass memory M. The segments are loaded via online download OND into a controller or control device, for example a SINUMERIK which represents a memory-programmable controller NCU. FIG. 7 does not indicate that the mass memory may only represent a portion of the control device that can be used to control the axes drives AA.

The diagram of FIG. 8 shows two encoded tables COTAI and COTAII as well as the corresponding decoded tables DETAI and DETAII. The first column SPI includes the marker signal and the second column SPII an encoded function. As shown in the decoded tables DETAI and DETAII, both an M-function as well as a position and/or a velocity is decoded. The function profile FP shows the tables in graphic form.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A numerical controller for machine tools, robots or production machines, comprising:
    means for generating marker signals, in particular desired position values, for system components, in particular drives, according to an interpolation clock cycle,
    a control axis providing reference values for reading a table according to the interpolation clock cycle, said reference values defining desired position values for synchronous successor axes,
    wherein a function is stored in the table, said function being independent of the interpolation clock cycle, and
    wherein the function is executed several times by the synchronous successor axes independent of the interpolation clock cycle.

2. The numerical controller of claim 1, wherein the function is a hardware-implemented function.

3. The numerical controller of claim 1, wherein the function is a software-implemented function.

4. The numerical controller of claim 1, wherein the table is processed in segments by a mass memory through a FIFO memory located in a controller, wherein the FIFO memory receives data from the mass memory.

5. The numerical controller of claim 1, wherein the table is integrated in sequential operations of ISO programs in such a way that the table is processed immediately at conclusion of a corresponding ISO program and that a following ISO program is started immediately at conclusion of an ongoing table processing.

6. The numerical controller of claim 1, wherein at least one ISO program is integrated in sequential operations of at least one table in such a way that the at least one ISO program is an active program that is started immediately at conclusion of a corresponding table operation and that a following table operation is started immediately at conclusion of the at least one active ISO program.

7. A method for numerical control of machine tools, robots or production machines, comprising the steps of:
    generating marker signals, in particular desired position values, for system components, in particular drives, according to an interpolation clock cycle,
    providing by way of a control axis reference values for reading a table according to the interpolation clock cycle,
    defining in the table encoded and/or non-encoded desired position values for synchronous successor axes, and/or extracting, independent from the interpolation clock cycle, encoded and/or non-encoded functions stored in the table, and
    triggering execution of these functions several times by the synchronous successor axes independent of the interpolation clock cycle.

8. The method of claim 7, wherein the functions include a hardware-implemented function.

9. The method of claim 7, wherein the functions include a software-implemented function.

10. The method of claim 7, wherein the table is processed in segments by a mass memory through a FIFO memory located in a controller, wherein the FIFO memory receives data from the mass memory.

11. The method of claim 7, wherein the table is integrated in sequential operations of ISO programs in such a way that the table is processed immediately at conclusion of a corresponding ISO program and that a following ISO program is started immediately at conclusion of an ongoing table processing.

12. The method of claim 7, wherein at least one ISO program is integrated in sequential operations of at least one table in such a way that the at least one ISO program is an active program that is started immediately before a conclusion of a corresponding table operation and that a following table operation is started immediately before a conclusion of the at least one active ISO program.

13. A numerical controller comprising a computer-readable storage medium tangibly embodying program instructions for control of machine tools, robots or production machines, the program instructions including instructions operable for causing a memory-programmable processor to:
- generate desired position values for system components, in particular drives, according to an interpolation clock cycle,
- provide by way of a control axis reference values for reading a table according to the interpolation clock cycle,
- define encoded and/or non-encoded desired position values for synchronous successor axes, and/or extract independent from the interpolation clock cycle encoded and/or non-encoded functions stored in the table, and trigger execution of these functions several times by the synchronous successor axes independent of the interpolation clock cycle.

14. The numerical controller of claim 1, wherein an additional parameter is provided which encodes the function so as to enable use of the function with a successor axis that is not moved synchronously with the control axis.

15. The numerical controller of claim 1, wherein several successor axes are controlled sequentially or simultaneously by the function.

16. The numerical controller of claim 1, wherein the successor axes are controlled independent of the clock cycle of the control axis.

17. The method of claim 7, wherein an additional parameter is provided which encodes the function so as to enable use of the function with a successor axis that is not moved synchronously with the control axis.

18. The method of claim 7, wherein several successor axes are controlled sequentially or simultaneously by the function.

19. The method of claim 7, wherein the successor axes are controlled independent of the clock cycle of the control axis.

* * * * *